May 24, 1966  SVEN-ERIC ISACSSON  3,252,556
ROLLER CONVEYOR
Filed Dec. 19, 1963  2 Sheets-Sheet 1
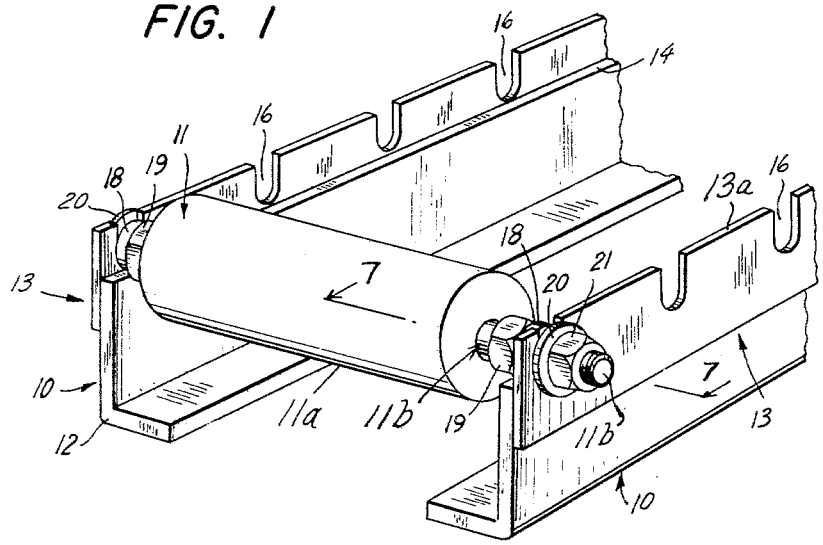
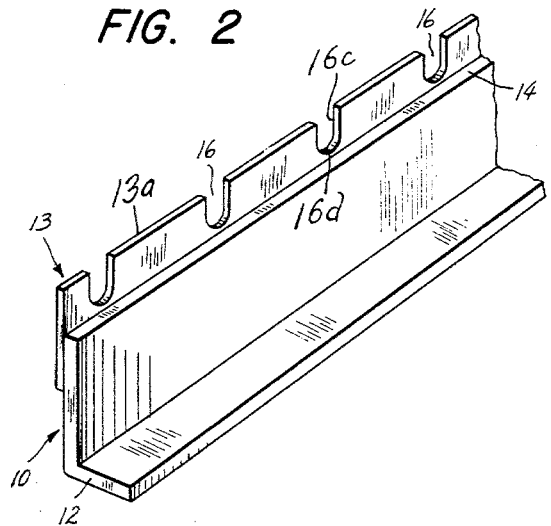
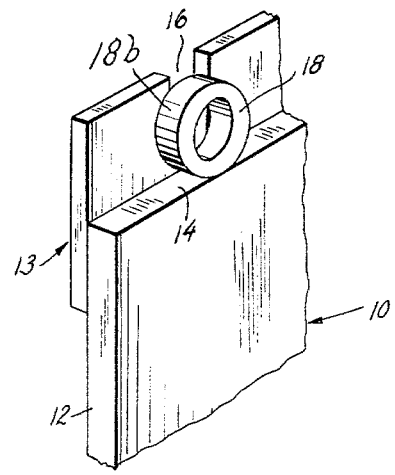
INVENTOR.
Sven-Eric Isacsson
BY
ATTORNEY May 24, 1966   SVEN-ERIC ISACSSON   3,252,556
ROLLER CONVEYOR Filed Dec. 19, 1963   2 Sheets-Sheet 2

INVENTOR.
Sven-Eric Isacsson
BY
his ATTORNEY

United States Patent Office 3,252,556
Patented May 24, 1966

3,252,556
ROLLER CONVEYOR
Sven-Eric Isacsson, Saffle, Sweden, assignor to Aktiebolaget Electrolux, Stockholm, Sweden, a corporation of Sweden
Filed Dec. 19, 1963, Ser. No. 331,801
Claims priority, application Sweden, Jan. 3, 1963, 52/63
6 Claims. (Cl. 193—37)

The present invention relates to improvements in roller conveyors of the type including two or more parallel, elongated support or side members and rollers supported on the latter for rotation about transverse axes.

Heretofore, each support member has consisted of a rail, for example of L-shaped cross-section, with cutouts located along the upper edge to receive the ends of the shafts of the rollers. Since it is of utmost importance that tangents to the rollers at the top of the latter form an absolute flat conveying surface, the cutouts had to be made with very small tolerances in the vertical direction. The maintenance of such small tolerances in the production of the support members involved great expense.

Accordingly, it is an object of the present invention to provide roller conveyors of the described character wherein the support members are inexpensively constructed and yet afford the requisite accuracy in vertically locating the rollers supported thereon.

In accordance with an aspect of this invention, each support member of the roller conveyor comprises a profiled rail, the upper edge of which forms a supporting surface for the journals or shafts of the rollers or for members supporting the shafts, and holding means which extends above the upper edge of the rail and is intended to maintain the positions of the journals or shafts along the rail, that is, in the longitudinal direction of the conveyor, such holding means being fastened to the profiled rail.

In one embodiment of the invention, the holding means of each elongated support member is constituted by an elongated, flat plate secured to the profiled rail, at one side of the latter, and projecting above the upper edge of the rail, such flat plate being formed with upwardly opening cutouts spaced therealong to receive the journals or shafts of the rollers for positioning the latter in the longitudinal direction of the conveyor, the cutouts of the flat plate being located in the direction normal to the upper edge of the rail so as to permit the desired load bearing engagement of that upper edge with the journals or shafts of the rollers or the members supporting the same.

The above, and other objects, features and advantages of the invention, will be apparent in the following detailed description of illustrative embodiments thereof which is to be read in connection with the accompanying drawing, wherein:

FIG. 1 is a perspective view of a portion of a roller conveyor embodying this invention and, in which, for the sake of simplicity, only one roller is shown mounted on the support members;

FIG. 2 is a perspective detail view of one of the support members of the conveyor;

FIG. 3 is an enlarged, fragmentary perspective view illustrating the cooperative relationship between the elongated support member of the conveyor and a member for supporting or mounting the shaft of a roller thereon;

Figure 4:
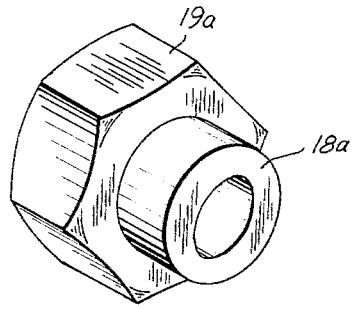
FIG. 4 is a detail perspective view of a modification in which the member for supporting or mounting the roller shaft on the side support member is combined with a nut for securing the roller shaft to the latter.

Referring to the drawing in detail, and initially to FIG. 1 thereof, it will be seen that a roller conveyor embodying this invention generally comprises two parallel, elongated side or support members generally identified by the reference numeral 10, and rollers 11 (of which only one appears on FIG. 1), which are supported on the support members 10 for rotation about transverse axes that are suitably spaced apart in the longitudinal direction of the conveyor.

As shown particularly on FIG. 2, each of the side or support members 10 of the roller conveyor embodying this invention includes an elongated, rigid profiled rail 12, which may be an angle bar, that is, have an L-shaped cross-section, as shown, and holding means generally identified by the reference numeral 13 and projecting above the upper, relatively wide edge 14 of rail 12 merely for the purpose of locating the rollers 11 in the longitudinal direction of the conveyor. In the embodiment of the invention illustrated by FIGS. 1, 2 and 3, the holding means 13 is constituted by an elongated, flat plate which may have a thickness substantially less than that of the rail 12 and which is secured to the outside of the latter, for example, by spot-welding, screws or the like, with the upper portion of the elongated plate 13 extending substantially above the upper edge 14 of the rail. The elongated plate 13 is formed with U-shaped notches or cutouts 16 opening at its upper edge 13a and being spaced apart along the latter by distances equal to the desired spacing between the axes of the rollers 11 of the conveyor.

The cutouts 16 are dimensioned to receive the journals or the shafts 11b on which the rollers 11 are freely rotatable, while permitting the loads borne by the rollers 11 to be transmitted from such journals or shaft ends to the upper edge surfaces 14 of rails 12, rather than to the bottom surfaces of the cutouts 16 of the relatively thin plates 13. Thus, by accurately machining and aligning the upper edge surfaces 14 of the rails 12, which operations can be easily and inexpensively performed, the accurate disposition of the axes of the several rollers 11 in a single flat plane is assured without requiring corresponding accuracy or small tolerances in the machining of the cutouts 16 particularly with respect to the depth of the latter.

Where the shafts 11b of the rollers 11 are intended to rest directly on the upper edge surfaces 14 of rails 12, then the cutouts 16 must extend sufficiently below the upper edge surfaces 14 to ensure that, within the manufacturing tolerances employed with respect to the cutouts, the shafts 11b will not engage the bottoms of the cutouts 16 before resting on the edge surfaces 14.

However, if the shafts 11b of each roller 11 are provided with members thereon for supporting the journals on upper edge surfaces 14, for example, in the form of washers or collars 18 of an axial thickness at least equal to the width of the upper edge surfaces 14, as in the embodiment of FIGS. 1 and 3, then it is apparent that the bearing loads may be transmitted, and the several rollers 11 vertically located by direct contact of the collars or supporting members 18 with upper edge surface 14 even though the lower edges of the cutouts 16 are located a small distance above the adjacent edge surfaces 14. In the latter case, it is only necessary that the distance between the upper edge surface 14 and the lower edges of the cutouts 16 be smaller than the radial thickness of each collar 18.

In order to secure each roller 11 to the side or support members 10, the shafts 11b thereof are threaded and each carry, in order starting at the inside closest to the roller, an inner nut 19, the spacing collar 18, a washer 20 and an outer nut 21. The inner nut 19 and spacing collar 18 are arranged on the corresponding shaft ends 11b before the roller is installed in the conveyor, with the nuts 19 being adjusted so that the collars 18 will rest upon the upper edge surfaces 14 of the rails 12 at the inside of the elongated plates 13 which constitute the holding means. Thereafter, the washers 20 and outer nuts 21 are placed on the threaded shaft ends projecting outwardly beyond the elongated plates 13, and the nuts 19 and 21 are tightened towards each other while checking the axial position of the related roller between the side or support members 10. Such tightening of the nuts 19 and 21 firmly clamps the elongated plate 13 between the spacing collar 18 and the washer 20 and thereby firmly secures the roller 11 in its assembled position. If, thereafter, it is necessary to remove any one of the rollers 11 from the conveyor, the same can be conveniently effected merely by loosening of the nuts 19 and 21.

As has been noted previously, exact alignment of the axes of all of the rollers 11 in a single flat plane is obtained without requiring the use of very small manufacturing tolerances for the cutouts 16 receiving the shafts 11b of the rollers. Further, the production of the cutouts 16 is facilitated to a great extent by reason of the fact that the elongated plates 13 in which such cutouts are formed may be of rather thin material, as the elongated plates 13 are not exposed to any vertical loads, the latter being transmitted only to the accurately machined upper edge surfaces 14 of the rigid rails 12.

Where spacing collars are interposed between the journals or shaft ends of each roller and the upper edge surfaces 14 of rails 12, as at 18 on FIGS. 1 and 2, such spacing collars can be formed as integral parts 18a of the inner nuts 19a, as shown on FIG. 4.

Figure 5:
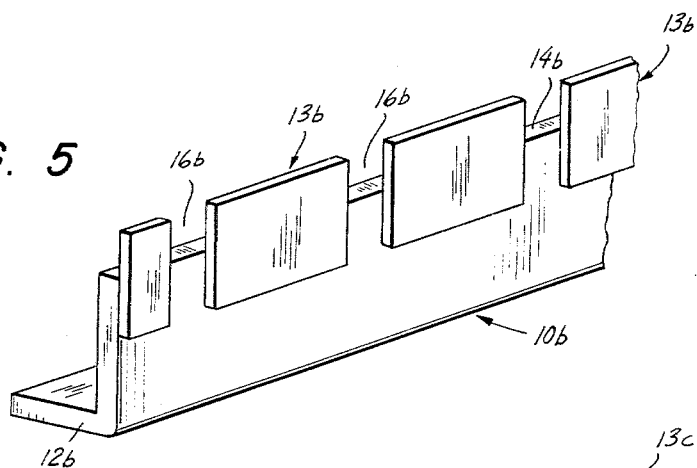
FIG. 5 is a detail perspective view, similar to that of FIG. 2, but showing alternative holding means for locating the rollers in the longitudinal direction of the conveyor.

Further, as shown on FIG. 5, the holding means provided on each rail 12b for locating the several rollers in the longitudinal direction of the conveyor may be constituted by plates 13b welded or otherwise secured to the outside of each rail 12b so as to project above the upper edge surface 14b of the latter, with the ends of the plates 13b being suitably spaced apart so as to define gaps 16b therebetween corresponding to the previously mentioned cutouts 16 and being also adapted to receive the shafts 11b of the rollers.

Figure 6:
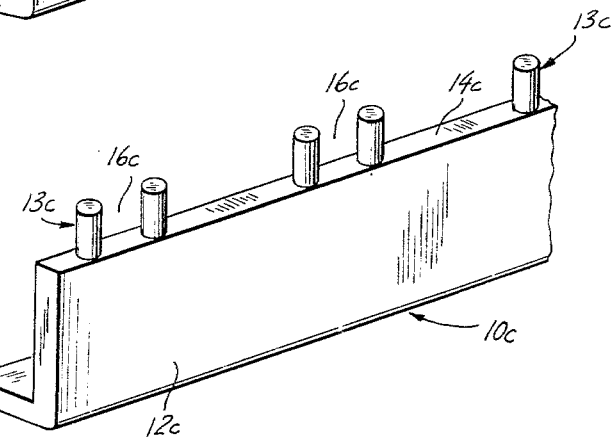
FIG. 6 is a view similar to that of FIG. 5, but showing another embodiment of the invention.

As shown on FIG. 6, the holding means provided on each side or support member 10c for locating the rollers of the conveyor in the longitudinal direction of the latter while the journals or shaft ends of the rollers are supported on the upper edge surface 14c of the rigid rail 12c may be constituted by suitably spaced apart pairs of pins 13c projecting upwardly from bores opening at the upper edge surface 14c so that the spaces 16c between the pairs of pins 13c are adapted to receive either the journals or shaft ends of the rollers, or the spacing collars 18 or 18a thereon, while permitting the latter to bear on the upper edge surface 14c.

In view of the foregoing, it will now be understood that I have provided a pair of spaced elongated rails 10 which are parallel to one another, the rails comprising the upright members 12 whose outer surfaces are vertical and substantially flat. The tops 14 of the rails 10 are defined by the tops of the members 12 which are flat, and, in transverse sections perpendicular to the elongated rails 10, are horizontal and define load supporting surfaces, as best seen in FIG. 1.

The roller 11 disposed between the rails comprises a first portion 11a intermediate the ends thereof which is of cylindrical form and second end portions 11b which are of smaller cross-sectional area than the first portion 11a and extend axially therefrom.

The second portions 11b of the roller 11 are stationary and the first intermediate portion 11a thereof is rotatable with respect to the second end portions 11b. The second end portions 11b include the collars 18 which may be referred to as first parts of cylindrical form which extend axially of the roller 11 to provide peripheral surfaces 18b resting on the load supporting surfaces 14 defined by the tops of the upright members 12. With this construction, the tops 14 of the rails 10 function to support the entire load adapted to be carried by the roller 11.

As pointed out above, structure is provided for holding the roller 11 in a fixed position lengthwise of the rails 10. This holding structure comprises upward extending means 13 attached to the upright members 12 and extending vertically upward from the top surfaces 14 thereof. The upward extending means 13, in a vertical plane passing through the axis of the roller 11, is formed with the positioning notches 16 which are directly opposite one another. The positioning notches 16 have opposing spaced vertical side walls 16c and closed ends 16d. The notches 16 have their closed ends at one level and their open ends at a higher level at the tops 13a of the upward extending means 13.

Figure 7:
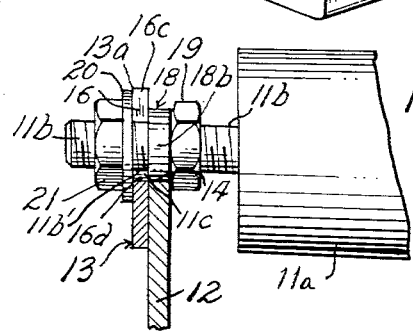
FIG. 7 is a fragmentary vertical sectional view taken at lines 7—7 of FIG. 1.

The second end portions 11b of the roller 11 include second parts 11b' which project axially beyond the first parts 18 and extend through the positioning notches 16 between the opposing side walls 16c thereof to position the roller 11 lengthwise of the rails 10. However, the second parts 11b' of the second end portions 11b of the roller 11 are disposed above the closed ends 16c of the positioning notches 16 at the one level and are vertically spaced therefrom, as indicated at 11c in FIG. 7. The second end portions 11b of the roller 11 are detachably fixed to the upward extending means 13 by means including nuts or members 19 and 21 threadedly connected to the second end portions 11b of the roller and axially movable thereon toward and from the upward extending means 13.

Although illustrative embodiments of the invention have been described in detail herein with reference to the accompanying drawing, it is to be noted that the invention is not limited to those precise embodiments, and that various changes and modifications may be effected therein by one skilled in the art without departing from the scope or spirit of the invention, except as defined in the appended claims.

What is claimed is:

1. In a roller conveyor, the combination of a pair of spaced elongated rails which are parallel to one another, said rails comprising upright members whose outer surfaces are vertical and substantially flat, the tops of said rails being defined by the tops of said upright members which are flat, and, in transverse sections perpendicular to said elongated rails, are horizontal and define load supporting surfaces, a roller disposed between said rails, said roller comprising a first portion intermediate the ends thereof which is of cylindrical form and second end portions which are of smaller cross-sectional area than the first portion and extend axially therefrom, the second end portions of said roller being stationary and the first intermediate portion thereof being rotatable with respect to the second end portions, the second end portions including first parts of cylindrical form which extend axially of said roller to provide peripheral surfaces resting on the load supporting surfaces defined by the tops of said upright members, whereby the tops of said rails function to support the entire load adapted to be carried by said roller, and structure for holding said roller in a fixed position lengthwise of said rails, comprising means attached to said upright members and extending vertically upward from the top surfaces thereof, said upward extending means, in a vertical plane passing through the axis of said roller, defining positioning notches directly opposite one another, the positioning notches having opposing spaced vertical side walls and closed ends, the notches having their closed ends at one level and their open ends at a higher level at the tops of said upward extending means, the second end portions of said roller including second parts which project axially beyond the first parts and extend through the positioning notches between the opposing side walls thereof to position said roller lengthwise of said rails, the second parts of the second end portions of said roller being disposed above the closed ends of the notches at the one level and vertically spaced therefrom, and means including members threadedly connected to the second end portions of said roller and axially movable thereon toward and from said upward extending means for detachably fixing the second end portions of said roller to said upward extending means.

2. Apparatus as set forth in claim 1 in which said upward extending means attached to said upright members comprise elongated plates having the positioning notches formed at the top surfaces thereof.

3. Apparatus as set forth in claim 1 in which said upward extending means attached to said upright members comprise a series of plates having gaps therebetween lengthwise of said rails, the opposing vertical edges of adjacent plates and the tops of said upright members defining the notches.

4. Apparatus as set forth in claim 1 in which the first parts of cylindrical form comprise collars mounted on the second end portions of said roller and rotatable thereon at the inner sides of said upward extending means, washers mounted on the second end portions of said roller and rotatable thereon at the outer sides of said upward extending means, and said members threadedly connected to the second end portions comprising a pair of nuts axially movable on each of the second end portions of said roller, said pairs of nuts including inner nuts disposed between said collars and the ends of the first intermediate portion of said roller and outer nuts disposed between said washers and the outer ends of the second end portions of said roller.

5. Apparatus as set forth in claim 1 in which the first parts of cylindrical form comprise collars mounted on the second end portions of said roller.

6. Apparatus as set forth in claim 5 in which at least one of said members threadedly connected to one of the second end portions of said roller and axially movable thereon is adjacent to one of said collars and integrally connected therewith.

References Cited by the Examiner
UNITED STATES PATENTS

| | | | |
|---|---|---|---|
| 1,004,976 | 10/1911 | Bodman | 193—35 |
| 1,219,901 | 3/1917 | Alvey | 193—35 |
| 2,593,089 | 4/1952 | Barry | 193—35 |
| 2,917,148 | 12/1959 | Roth | 193—35 |

FOREIGN PATENTS 1,198,319   12/1959   France.

HUGO O. SCHULZ, *Primary Examiner.*

SAMUEL F. COLEMAN, *Examiner.*

A. L. LEVINE, *Assistant Examiner.*